US012718732B2

(12) United States Patent
Meng et al.

(10) Patent No.: US 12,718,732 B2
(45) Date of Patent: Aug. 25, 2026

(54) TIMING CONTROLLER AND SENSING COMPENSATION METHOD THEREOF, AND DISPLAY PANEL

(71) Applicants: Hefei BOE Joint Technology Co., Ltd., Hefei (CN); BOE Technology Group Co., Ltd., Beijing (CN)

(72) Inventors: Song Meng, Beijing (CN); Yue Wu, Beijing (CN); Jian Mao, Beijing (CN); Jingbo Xu, Beijing (CN); Miao Liu, Beijing (CN); Cheng Xu, Beijing (CN)

(73) Assignees: Hefei BOE Joint Technology Co., Ltd., Hefei (CN); BOE Technology Group Co., Ltd., Beijing (CN)

( * ) Notice: Subject to any disclaimer, the term of this patent is extended or adjusted under 35 U.S.C. 154(b) by 480 days.

(21) Appl. No.: 18/029,107

(22) PCT Filed: Jun. 29, 2022

(86) PCT No.: PCT/CN2022/102532

§ 371 (c)(1),
(2) Date: Mar. 29, 2023

(87) PCT Pub. No.: WO2024/000322

PCT Pub. Date: Jan. 4, 2024

(65) Prior Publication Data

US 2024/0363050 A1 Oct. 31, 2024

(51) Int. Cl.
*G09G 3/20* (2006.01)
*G09G 3/3225* (2016.01)
(Continued)

(52) U.S. Cl.
CPC ......... *G09G 3/2092* (2013.01); *G09G 3/3225* (2013.01); *G09G 3/32* (2013.01);
(Continued)

(58) Field of Classification Search
CPC ...... G09G 3/2092; G09G 3/32; G09G 3/3225; G09G 3/3233; G09G 2300/0842; G09G 2320/0257; G09G 2320/045
See application file for complete search history.

(56) References Cited

U.S. PATENT DOCUMENTS

2007/0109290 A1 5/2007 Lee
2012/0120067 A1* 5/2012 Kim .................... G09G 3/3648 345/419
(Continued)

FOREIGN PATENT DOCUMENTS

CN 105825800 A 8/2016
CN 110012247 A 7/2019
(Continued)

*Primary Examiner* — William Boddie
*Assistant Examiner* — Saifeldin E Elnafia

(57) ABSTRACT

Provided are a timing controller, sensing compensation method thereof, and display panel. The timing controller includes a sensing module (501), a built-in picture generation module (502), a multi-channel data selection module (503) and a processing output module (504). The sensing module is configured to sense whether a sensing compensation instruction is received, when received, notify built-in picture generation module and multi-channel data selection module; built-in picture generation module is configured to receive a notification and generate a first video signal; multi-channel data selection module is configured to receive a notification, switch from a display mode to a built-in picture mode, select first video signal as a video source, output first video signal to processing output module; processing output module is configured to process first video signal and output processed first video signal to the display panel so that the display panel performs sensing compensation based on the first video signal.

16 Claims, 10 Drawing Sheets

(51) Int. Cl.
*G09G 3/3233* (2016.01)
*G09G 3/32* (2016.01)

(52) U.S. Cl.
CPC ... *G09G 3/3233* (2013.01); *G09G 2300/0842* (2013.01); *G09G 2320/0257* (2013.01); *G09G 2320/045* (2013.01)

(56) References Cited

U.S. PATENT DOCUMENTS

| | | | | |
|---|---|---|---|---|
| 2014/0347403 | A1 | 11/2014 | Song et al. | |
| 2016/0189617 | A1* | 6/2016 | Park | G09G 5/10<br>345/690 |
| 2016/0217724 | A1 | 7/2016 | Kim | |
| 2019/0189056 | A1* | 6/2019 | Gai | G09G 3/3233 |
| 2019/0392760 | A1* | 12/2019 | Zeng | G09G 3/3266 |
| 2020/0168174 | A1* | 5/2020 | Li | G09G 3/3614 |
| 2024/0274096 | A1* | 8/2024 | Xiao | G09G 3/2092 |

FOREIGN PATENT DOCUMENTS

| | | | | |
|---|---|---|---|---|
| CN | 111681606 | A | 9/2020 | |
| CN | 112967679 | A | 6/2021 | |
| CN | 113112962 | A | 7/2021 | |
| CN | 113192451 | A | 7/2021 | |
| CN | 113593485 | A | * 11/2021 | G09G 3/2092 |

* cited by examiner

TIMING CONTROLLER AND SENSING COMPENSATION METHOD THEREOF, AND DISPLAY PANEL

CROSS-REFERENCE TO RELATED APPLICATION

The present application is a U.S. National Phase Entry of International Application No. PCT/CN2022/102532 having an international filing date of Jun. 29, 2022, the content of which is incorporated into this application by reference.

TECHNICAL FIELD

Embodiments of the present disclosure relate to, but are not limited to, the field of display technology, and in particular, relate to a timing controller, a sensing compensation method thereof, and a display panel.

BACKGROUND

An Organic Light Emitting Diode (OLED) is an active light emitting display device, which has the advantages of luminescence, ultra-thinness, wide angle of view, high brightness, high contrast, low power consumption, extremely high response speed, etc. According to different drive modes, the OLED may be divided into a passive matrix drive (referred to as PM) type OLED and an active matrix drive (referred to as AM) type OLED. An AMOLED is a current driven device in which an independent thin film transistor (TFT) is used for controlling each sub-pixel, and each sub-pixel may be continuously and independently driven to emit light.

SUMMARY

The following is a summary of subject matters described herein in detail. The summary is not intended to limit the protection scope of claims.

An embodiment of the present disclosure provides a timing controller including a sensing module, a built-in picture generation module, a multi-channel data selection module and a processing output module.

The sensing module is configured to sense whether a sensing compensation instruction is received; when the sensing compensation instruction is received, notify the built-in picture generation module and the multi-channel data selection module.

The built-in picture generation module is configured to receive a notification from the sensing module and generate a first video signal.

The multi-channel data selection module is configured to receive a notification from the sensing module, switch from a display mode to a built-in picture mode, select the first video signal generated by the built-in picture generation module as a video source, and output the first video signal to the processing output module.

The processing output module is configured to process the first video signal and output the processed first video signal to a display panel to enable the display panel to perform sensing compensation based on the first video signal.

An embodiment of the present disclosure further provides a display panel including the timing controller according to any one of the embodiments of the present disclosure.

An embodiment of the present disclosure further provides a sensing compensation method, including:

in a display mode, a timing controller senses whether a sensing compensation instruction is received;

when the sensing compensation instruction is received, the timing controller switches from the display mode to a built-in picture mode to generate a first video signal;

the timing controller processes the first video signal, and outputs the processed first video signal to the display panel to enable the display panel to perform sensing compensation based on the first video signal.

An embodiment of the present disclosure further provides a timing controller, including a memory and a processor connected to the memory for storing instructions, the processor is configured to perform the acts of the sensing compensation method described in any embodiment of the present disclosure.

An embodiment of the present disclosure further provides a computer-readable storage medium, on which a computer program is stored, and when the program is executed by a processor, the sensing compensation method described in any embodiment of the present disclosure is implemented.

An embodiment of the disclosure further provides a timing controller including a sensing circuit, a built-in picture generation circuit, a multi-channel data selection circuit, and a processing output circuit.

The sensing circuit is configured to sense whether a sensing compensation instruction is received; when the sensing compensation instruction is received, notify the built-in picture generation circuit and the multi-channel data selection circuit.

The built-in picture generation circuit is configured to receive a notification from the sensing circuit and generate a first video signal.

The multi-channel data selection circuit is configured to receive a notification from the sensing circuit, switch from a display mode to a built-in picture mode, select the first video signal generated by the built-in picture generation module as a video source, and output the first video signal to the processing output circuit.

The processing output circuit is configured to process the first video signal and output the processed first video signal to the display panel to enable the display panel to perform sensing compensation based on the first video signal.

Other aspects may be comprehended upon reading and understanding drawings and detailed descriptions.

BRIEF DESCRIPTION OF DRAWINGS

The accompanying drawings are used for providing understanding of technical solutions of the present disclosure, and form a part of the specification. They are used for explaining the technical solutions of the present disclosure together with the embodiments of the present disclosure, but do not form a limitation on the technical solutions of the present disclosure.

DETAILED DESCRIPTION

Figure 1:
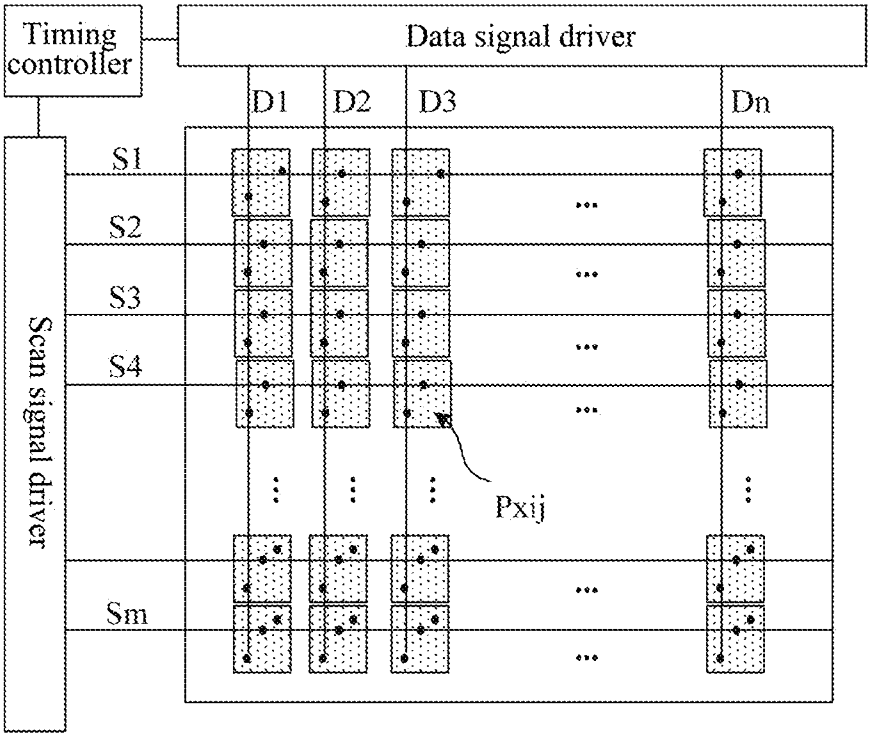
FIG. 1 is a schematic diagram of a structure of a display apparatus.

To make objectives, technical solutions, and advantages of the present disclosure clearer, the embodiments of the present disclosure will be described in detail with reference to the accompanying drawings. Implementations may be implemented in multiple different forms. Those of ordinary skills in the art may easily understand such a fact that implementations and contents may be transformed into various forms without departing from the purpose and scope of the present disclosure. Therefore, the present disclosure should not be explained as being limited to contents described in following implementations only. The embodiments in the present disclosure and features in the embodiments may be combined randomly with each other without conflict.

Scales of the drawings in the present disclosure may be used as a reference in the actual process, but are not limited thereto. For example, the width-length ratio of the channel, the thickness and spacing of each film layer, and the width and spacing of each signal line may be adjusted according to actual needs. The number of pixels in the display panel and the number of sub-pixels in each pixel are not limited to the numbers shown in the drawings. The drawings described in the present disclosure are schematic structure diagrams only, and one implementation of the present disclosure is not limited to the shapes, numerical values or the like shown in the drawings.

Ordinal numerals such as "first", "second", and "third" in the specification are set to avoid confusion of constituent elements, but not to set a limit in quantity.

In the specification, for convenience, wordings indicating orientation or positional relationships, such as "middle", "upper", "lower", "front", "back", "vertical", "horizontal", "top", "bottom", "inside", and "outside", are used for illustrating positional relationships between constituent elements with reference to the drawings, and are merely for facilitating the description of the specification and simplifying the description, rather than indicating or implying that a referred apparatus or element must have a particular orientation and be constructed and operated in the particular orientation. Therefore, they cannot be understood as limitations on the present disclosure. The positional relationships between the constituent elements may be changed as appropriate according to directions for describing the various constituent elements. Therefore, appropriate replacements may be made according to situations without being limited to the wordings described in the specification.

In the specification, unless otherwise specified and defined explicitly, terms "mount", "mutually connect", and "connect" should be understood in a broad sense. For example, a connection may be a fixed connection, or a detachable connection, or an integrated connection; it may be a mechanical connection or an electrical connection; it may be a direct mutual connection, or an indirect connection through middleware, or internal communication between two components. Those of ordinary skill in the art may understand specific meanings of these terms in the present disclosure according to specific situations.

In the specification, a transistor refers to a component which includes at least three terminals, i.e., a gate electrode, a drain electrode and a source electrode. The transistor has a channel region between the drain electrode (drain electrode terminal, drain region, or drain) and the source electrode (source electrode terminal, source region, or source), and a current may flow through the drain electrode, the channel region, and the source electrode. It is to be noted that, in the specification, the channel region refers to a region through which the current mainly flows.

In the specification, a first electrode may be a drain electrode, and a second electrode may be a source electrode. Or, the first electrode may be the source electrode, and the second electrode may be the drain electrode. In cases that transistors with opposite polarities are used, a current direction changes during operation of a circuit, or the like, functions of the "source electrode" and the "drain electrode" are sometimes interchangeable. Therefore, the "source electrode" and the "drain electrode", as well as the "source terminal" and the "drain terminal" are interchangeable in the specification.

In the specification, "electrical connection" includes a case that constituent elements are connected together through an element with a certain electrical effect. The "element with the certain electrical effect" is not particularly limited as long as electrical signals may be sent and received between the connected constituent elements. Examples of the "element with the certain electrical effect" not only include electrodes and wirings, but also include switch elements such as transistors, resistors, inductors, capacitors, other elements with various functions, etc.

In the specification, "parallel" refers to a state in which an angle formed by two straight lines is −10° or more and 10° or less, and thus also includes a state in which the angle is −5° or more and 5° or less. In addition, "perpendicular" refers to a state in which an angle formed by two straight lines is 80° or more and 100° or less, and thus also includes a state in which the angle is 85° or more and 95° or less.

In the specification, a "film" and a "layer" are interchangeable. For example, a "conductive layer" may be replaced with a "conductive film" sometimes. Similarly, an "insulation film" may be replaced with an "insulation layer" sometimes.

Triangle, rectangle, trapezoid, pentagon and hexagon in this specification are not strictly defined, and they may be approximate triangle, rectangle, trapezoid, pentagon or hexagon, etc. There may be some small deformation caused by tolerance, and there may be chamfer, arc edge and deformation, etc.

In the present disclosure, "about" refers to that a boundary is defined not so strictly and numerical values within process and measurement error ranges are allowed.

FIG. 1 is a schematic diagram of a structure of a display apparatus. As shown in FIG. 1, the display apparatus may include a timing controller, a data signal driver, a scan signal driver, and a pixel array. The timing controller is connected to the data signal driver and the scan signal driver respectively, the data signal driver is connected to multiple data signal lines (D1 to Dn) respectively, and the scan signal driver is connected to multiple scan signal lines (S1 to Sm) respectively. The pixel array may include multiple sub-pixels Pxij, wherein i and j may be natural numbers. At least one sub-pixel Pxij may include a circuit unit and a light emitting device connected to the circuit unit, wherein the circuit unit may include at least one scan signal line, at least one data signal line and a pixel drive circuit. In an exemplary implementation, the timing controller may provide a gray scale value and a control signal that are suitable for the specification of the data signal driver to the data signal driver, and may provide a clock signal, a scan starting signal, and the like that are suitable for the specification of the scan signal driver to the scan signal driver. The data signal driver may generate data voltages to be provided to data signal lines D1, D2, D3 . . . , and Dn using the gray scale value and the control signal received from the timing controller. For example, the data signal driver may sample the gray scale value using a clock signal, and apply a data voltage corresponding to the gray scale value to the data signal lines D1 to Dn by taking a pixel row as a unit, wherein n may be a natural number. The scan signal driver may generate scan signals to be provided to scan signal lines S1, S2, S3 . . . , and Sm by receiving the clock signal, the scan starting signal, and the like from the timing controller. For example, the scan signal driver may sequentially provide a scan signal with an on-level pulse to the scan signal lines S1 to Sm. For example, the scan signal driver may be constructed as a form of a shift register and generate a scan signal in a manner of sequentially transmitting a scan starting signal provided in a form of an on-level pulse to a next-stage circuit under control of the clock signal, wherein m may be a natural number.

Figure 2:
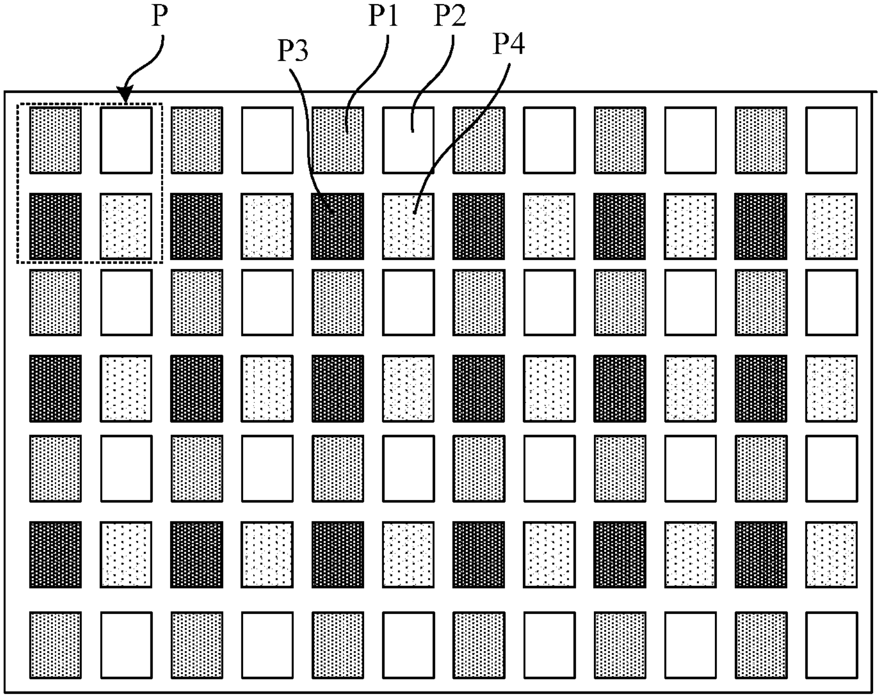
FIG. 2 is a schematic diagram of a planar structure of a display panel.

FIG. 2 is a schematic diagram of a planar structure of a display panel. As shown in FIG. 2, the display panel may include multiple pixel units P arranged in a matrix. At least one of the multiple pixel units P includes a first sub-pixel P1 emitting light of a first color, a second sub-pixel P2 emitting light of a second color, a third sub-pixel P3 emitting light of a third color, and a fourth sub-pixel P4 emitting light of the fourth color. The four sub-pixels each may include a circuit unit and a light emitting device. The circuit unit may include a scan signal line, a data signal line, and a pixel drive circuit that is electrically connected to the scan signal line and the data signal line, respectively. The pixel drive circuit is configured to receive a data voltage transmitted by the data signal line and output a corresponding current to the light emitting device under the control of the scan signal line. The light emitting device in each sub-pixel is connected with a pixel drive circuit of the sub-pixel where the light emitting device is located, and is configured to emit light with a corresponding brightness in response to a current output by the pixel drive circuit of the sub-pixel where the light emitting device is located.

In some exemplary embodiments, the first sub-pixel P1 may be a red sub-pixel (R) emitting red light, the second sub-pixel P2 may be a green sub-pixel (G) emitting green light, the third sub-pixel P3 may be a white sub-pixel (W) emitting white light, and the fourth sub-pixel P4 may be a blue sub-pixel (B) emitting blue light.

In some exemplary embodiments, the sub-pixel may have a shape of a rectangle, a rhombus, a pentagon, or a hexagon. In an exemplary implementation, the four sub-pixels may be arranged in a horizontal side-by-side manner to form an RWBG pixel arrangement. In another exemplary implementation, the four sub-pixels may be arranged in a square, diamond, vertical side-by-side manner or the like, which is not limited here in the present disclosure.

In an exemplary embodiment, multiple sub-pixels sequentially arranged in the horizontal direction are referred to as a pixel row, and multiple sub-pixels sequentially arranged in the vertical direction are referred to as a pixel column; the multiple pixel rows and the multiple pixel columns together form a pixel array arranged in an array.

Figure 3:
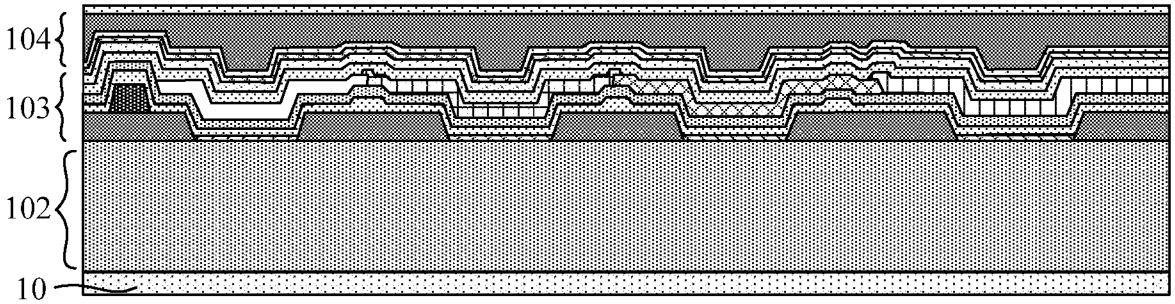
FIG. 3 is a schematic diagram of a sectional structure of a display panel.

FIG. 3 is a schematic diagram of a sectional structure of a display panel, and illustrates a structure of four sub-pixels of the display panel. As shown in FIG. 3, on a plane perpendicular to the display panel, each sub-pixel of the display panel may include a drive circuit layer 102 arranged on a substrate 10, a light emitting structure layer 103 arranged on a side of the drive circuit layer 102 away from the substrate, and an encapsulation layer 104 arranged on a side of the light emitting structure layer 103 away from the substrate.

In an exemplary implementation, the substrate 10 may be a flexible base substrate, or a rigid base substrate. The drive circuit layer 102 of each sub-pixel may include a pixel drive circuit formed by multiple transistors, and storage capacitor (s). The light emitting structure layer 103 of each sub-pixel may include a light emitting device formed by multiple film layers, wherein the multiple film layers may include an anode, a pixel define layer, an organic light emitting layer, and a cathode. The anode is connected with a pixel drive circuit. The organic light emitting layer is connected with the anode. The cathode is connected with the organic light emitting layer. The organic light emitting layer emits light of a corresponding color under driving of the anode and the cathode. The encapsulation layer 104 may include a first encapsulation layer, a second encapsulation layer, and a third encapsulation layer that are stacked, the first encapsulation layer and the third encapsulation layer may be made of an inorganic material, the second encapsulation layer may be made of an organic material, and the second encapsulation layer is disposed between the first encapsulation layer and the third encapsulation layer, to ensure that external water vapor cannot enter the light emitting structure layer 103.

In an exemplary implementation, the organic light emitting layer may include a Hole Injection Layer (HIL), a Hole Transport Layer (HTL), an Electron Block Layer (EBL), an Emitting Layer (EML), a Hole Block Layer (HBL), an Electron Transport Layer (ETL), and an Electron Injection Layer (EIL). In an exemplary embodiment, the hole injection layers, hole transport layers, electron block layers, hole block layers, electron transport layers and electron injection layers of all sub-pixels may be a common layer connected together, and emitting layers of all sub-pixels may be a common layer connected together, or may be isolated from each other, and the emitting layers of adjacent sub-pixels may overlap slightly. In some possible implementations, the display panel may include other film layers, which is not limited in the present disclosure.

Figure 4:
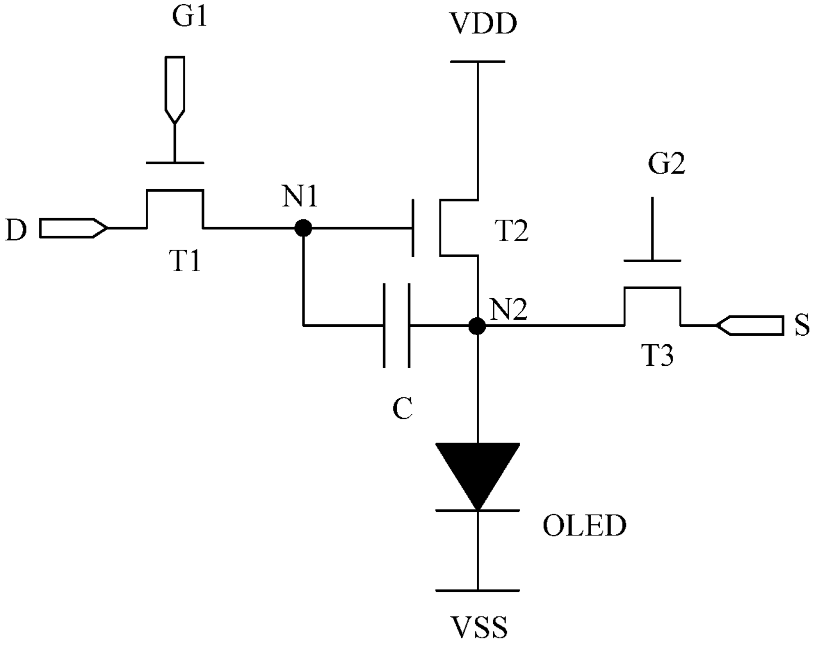
FIG. 4 is a schematic diagram of an equivalent circuit of a pixel drive circuit.

In an exemplary implementation, the pixel drive circuit may have a structure of 3T1C, 4T1C, 5T1C, 5T2C, 6T1C, 7T1C or 8T1C. FIG. 4 is a schematic diagram of an equivalent circuit of a pixel drive circuit. As shown in FIG. 4, the pixel drive circuit has a 3T1C structure, which may include three transistors (a first transistor T1, a second transistor T2, and a third transistor T3), one storage capacitor C, and six signal lines (a data signal line D, a first scan signal line G1, a second scan signal line G2, a compensation signal line S, a first power supply line VDD, and a second power supply line VSS).

In an exemplary implementation, the first transistor T1 is a switching transistor, the second transistor T2 is a drive transistor, and the third transistor T3 is a compensation transistor. A first electrode of the storage capacitor C is coupled to a control electrode of the second transistor T2, a second electrode of the storage capacitor C is coupled to a second electrode of the second transistor T2, and the storage capacitor C is configured to store a potential of the control electrode of the second transistor T2. A control electrode of the first transistor T1 is coupled to the first scan signal line G1, a first electrode of the first transistor T1 is coupled to the data signal line D, a second electrode of the first transistor T1 is coupled to the control electrode of the second transistor T2. The first transistor T1 is configured to receive a data signal transmitted by the data signal line D under the control of the first scan signal line G1, so that the control electrode of the second transistor T2 receives the data signal. The control electrode of the second transistor T2 is coupled to the second electrode of the first transistor T1, a first electrode of the second transistor T2 is coupled to the first power supply line VDD, a second electrode of the second transistor T2 is coupled to a first electrode (anode) of the light emitting device, and the second transistor T2 is configured to generate a corresponding current at the second electrode under the control of the data signal received by the control electrode of the second transistor. A control electrode of the third transistor T3 is coupled to the second scan signal line G2, a first electrode of the third transistor T3 is coupled to the compensation signal line S, a second electrode of the third transistor T3 is coupled to the second electrode of the second transistor T2. The third transistor T3 is configured to obtain a threshold voltage Vth of the second transistor T2 and the mobility K in response to compensation timing, to compensate the threshold voltage Vth. The second electrode (cathode) of the light emitting device is connected to the second power supply line VSS.

In an exemplary embodiment, the light emitting device may be an OLED, including a first electrode (anode), an organic emitting layer, and a second electrode (cathode) which are stacked. The first electrode of the OLED is coupled to the second electrode of the second transistor T2, a second electrode of the OLED is coupled to the second power supply line VSS, and the OLED is configured to emit light with a corresponding brightness in response to the current of the second electrode of the second transistor T2.

In an exemplary implementation, a signal of the first power supply line VDD is a high-level signal continuously provided, and a signal of the second power supply line VSS is a low-level signal. The first transistor T1 to the third transistor T3 may be P-type transistors or may be N-type transistors. Usage of a same type of transistors in a pixel drive circuit may simplify a process flow, reduce process difficulties of a display panel, and improve a product yield.

In an exemplary implementation, the first transistor T1 to the third transistors T3 may adopt low temperature poly silicon thin film transistors, or oxide thin film transistors, or low temperature poly silicon thin film transistors and oxide thin film transistors. An active layer of a low temperature poly silicon thin film transistor is made of Low Temperature Poly Silicon (LTPS for short), and an active layer of an oxide thin film transistor is made of an oxide. The low temperature poly silicon thin film transistor has advantages of a high mobility, fast charging, and the like, and the oxide thin film transistor has advantages of a low leakage current and the like. In an exemplary embodiment, the low temperature poly-silicon thin film transistor and the oxide thin film transistor may be integrated on one display panel to form a Low Temperature Polycrystalline Oxide (LTPO for short) display panel, so that advantages of the two may be utilized, high Pixel Per Inch (PPI for short) and low-frequency drive can be achieved, power consumption can be reduced, and display quality can be improved. In an exemplary implementation, the light emitting device may be an organic light emitting diode (OLED), including a first electrode (anode), an organic light emitting layer, and a second electrode (cathode) that are stacked.

During the use of an OLED display panel, characteristic drift will occur on the drive transistor of the OLED device due to the influence of current stress, temperature and illumination. This change is reflected in the display screen, which will cause the residual images of the display. Therefore, TFT compensation technology is needed to eliminate these residual images. The characteristic parameters that TFT needs to compensate include two: threshold voltage Vth and mobility K, wherein sensing time of mobility K is short, about several hundred microseconds. Therefore, the sensing of mobility K may be carried out either in the shutdown state or in a frame blanking time in real time display. However, the sensing of threshold voltage Vth requires a long charging time, exceeding 30 milliseconds. Therefore, the sensing of threshold voltage Vth is usually carried out in the shutdown state of a black picture.

When the display apparatus performs sensing compensation, it needs three flag signals, of video signal, namely frame synchronization (VS), row synchronization (HS) and data enabling (DE), to perform charging sensing row by row. If the video signal sent from the TV motherboard (SOC board) is unstable during the shutdown sensing, the sensed flag signal will fluctuate, part of the signal will be lost, and the period thereof will change. These unstable phenomena will cause errors in the source control signal and gate control signal in the sensing and compensation process, thereby causing the sensing compensation function to be abnormal. For example, the abnormal display occurs, or the wrong voltage value is sensed and then the wrong compensation data is calculated, and the wrong compensation data not only fails to achieve the compensation effect, but even makes the display effect worse.

Figure 5:
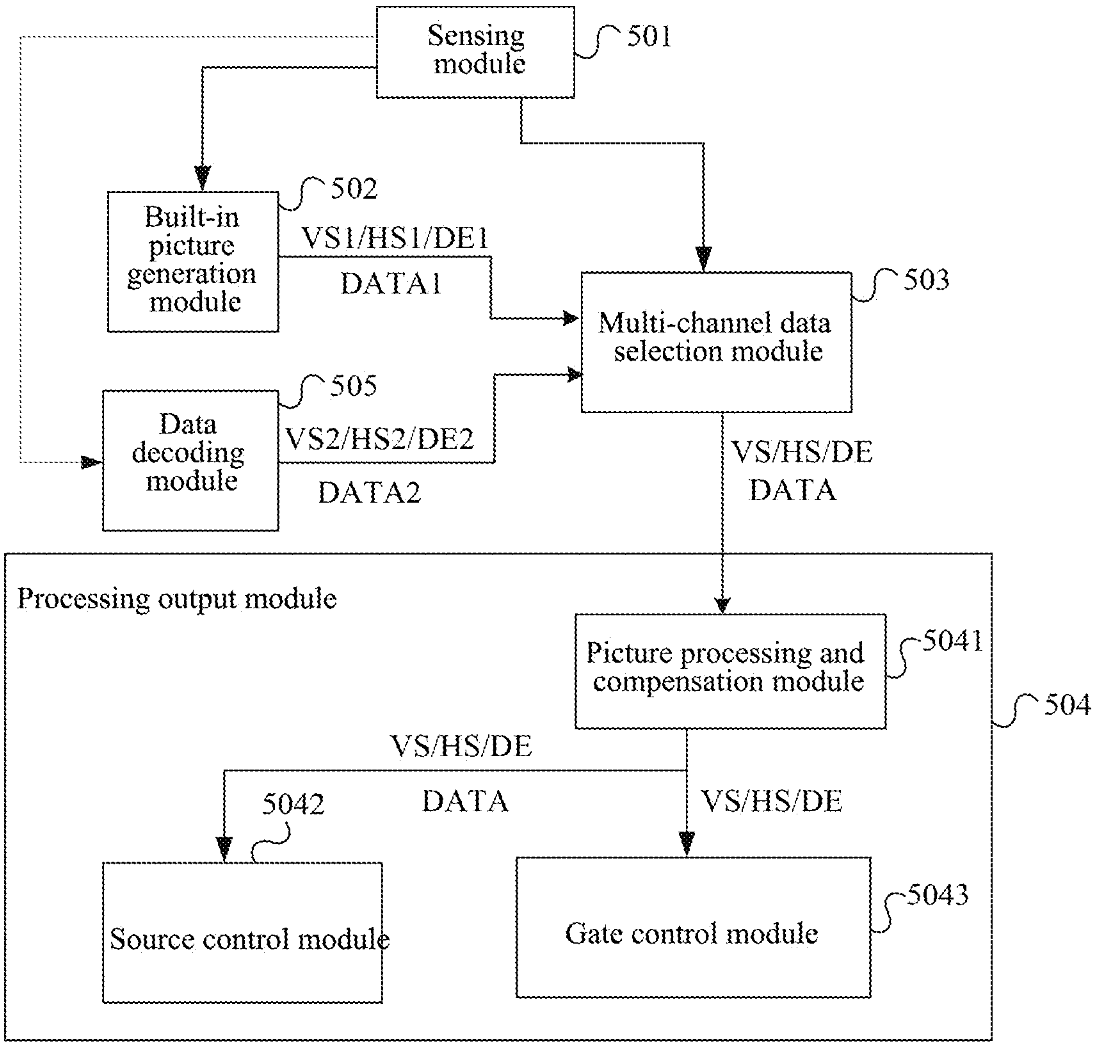
FIG. 5 is a schematic diagram of a structure of a timing controller according to an exemplary embodiment of the present disclosure.

As shown in FIG. 5, an embodiment of the present disclosure provides a timing controller (TCON) including a sensing module 501, a built-in picture generation module 502, a multi-channel data selection module 503, and a processing output module 504.

The sensing module 501 is configured to sense whether a sensing compensation instruction is received; and when the sensing compensation instruction is received, notify the built-in picture generation module 502 and the multi-channel data selection module 503.

The built-in picture generation module 502 is configured to generate a first video signal after receiving a notification from the sensing module 501.

The multi-channel data selection module 503 is configured to receive a notification from the sensing module 501, switch from a display mode to a built-in picture mode, select the first video signal generated by the built-in picture generation module 502 as a video source, and output the first video signal to the processing output module 504.

The processing output module 504 is configured to process the first video signal and output the processed first video signal to a display panel to enable the display panel to perform sensing compensation based on the first video signal.

According to the timing controller of the embodiment of the present disclosure, by providing the built-in picture generation module 502 and the multi-channel data selection module 503, when sensing compensation is to be performed, the video source is switched, by the multi-channel data selection module 503, to the first video signal generated by the built-in picture generation module 502. Since the first video signal generated by the built-in picture generation module 502 is stable, the normal sensing compensation can be fully ensured.

Embodiments of the present disclosure do not limit how the display panel performs sensing compensation based on the first video signal. Users can set different structures of pixel drive circuit and sensing compensation circuit, according to the structure of the pixel drive circuit and the sensing compensation circuit, the corresponding sensing compensation timing is designed. The timing controller drives the pixel drive circuit and the sensing compensation circuit to work according to the sensing compensation timing to obtain the corresponding sensing voltage value, and then calculates the compensation gain value of an element to be driven according to the obtained sensing voltage value.

In some exemplary embodiments, as shown in FIG. 5, the processing output module 504 includes a picture processing and compensation module 5041, a source drive control module 5042 and a gate drive control module 5043, and the display panel includes a data signal driver and a scan signal driver.

The picture processing and compensation module 5041 is configured to perform picture processing and uniformity compensation on the first video signal or the second video signal, and output the first video signal or the second video signal on the picture processing and uniformity compensation is performed to the source drive control module 5042 and the gate drive control module 5043.

The source drive control module 5042 is configured to generate a source control signal and a data signal according to the first video signal or the second video signal and output to the data signal driver.

The gate drive control module 5043 is configured to generate a gate control signal according to the first video signal or the second video signal and output to the scan signal driver.

In some exemplary embodiments, the sensing compensation instruction may be sent over an Inter-Integrated Circuit (IIC) bus.

IIC bus is a serial communication bus, which uses a multi-master-and-slave architecture. IIC bus uses the least signal lines among all kinds of buses, and has the functions of automatic addressing, multi-host clock synchronization and arbitration. It is very convenient, flexible and small in size to design computer systems by using IIC bus, so it is widely used in various practical applications. In some other exemplary embodiments, the sensing compensation instruction may also be sent over other bus protocols, and the embodiments of the present disclosure are not limited thereto.

In some exemplary embodiments, the sensing compensation instruction may be a sensing compensation instruction during startup, a sensing compensation instruction during shutdown, a sensing compensation instruction to be executed at user-specified time.

In an embodiment of the present disclosure, in the startup operation stage of the display apparatus, the sensing module 501 may judge whether a startup sensing of electrical compensation parameter of the display apparatus is needed. When startup sensing needs to be performed on the electrical compensation parameter of the display apparatus, the following startup operation is carried out: startup sensing is performed on the electrical compensation parameter of the display apparatus to obtain new compensation parameter value, and the new compensation parameter value is stored in a memory.

In the shutdown operation stage of the display apparatus, the sensing module 501 may judge whether a shutdown sensing of the electrical compensation parameter of the display apparatus is needs. When a shutdown sensing needs to be performed on the electrical compensation parameter of the display apparatus, the shutdown operation is performed as follows: the shutdown sensing is performed on the electrical compensation parameter of the display apparatus to obtain a new compensation parameter value, and the new compensation parameter value is stored in a memory.

During the operation of the display apparatus, the sensing module 501 may also sense the electrical compensation parameter of the display apparatus according to the sensing time specified by the user, to obtain new compensation parameter value, and store the new compensation parameter value in a memory.

Figure 6:
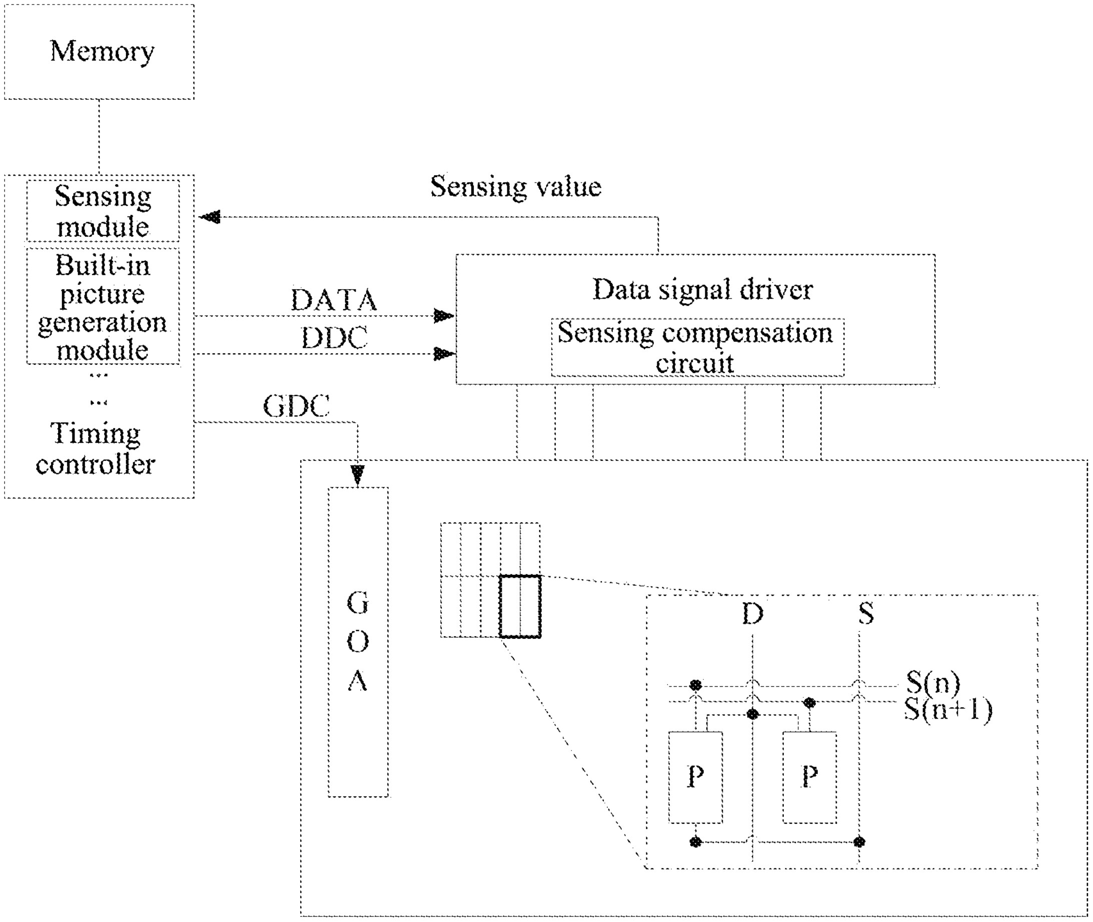
FIG. 6 is a schematic diagram of a structure of a display panel according to an exemplary embodiment of the present disclosure.

As shown in FIG. 6, an embodiment of the present disclosure further provides a display panel. The display panel includes multiple pixel units P, at least one pixel unit P includes multiple sub-pixels, at least one sub-pixel includes a pixel drive circuit (not shown in the figure), a sensing compensation circuit (not shown in the figure) and an element to be driven (not shown in the figure). The display panel further includes a timing controller, a data signal driver, a scan signal driver.

The pixel drive circuit is configured to drive the element to be driven to emit light at an active time.

The sensing compensation circuit is configured to sense an electrical characteristic of the element to be driven at a blank time or a specified time.

The timing controller is configured to sense whether a sensing compensation instruction is received in a display mode; when the sensing compensation instruction is received, switch a display mode to a built-in picture mode, and generate a first video signal; process the first video signal and output the processed first video signal to the display panel, to enable the display panel to perform sensing compensation based on the first video signal.

The time of each frame of the display apparatus is divided into active time and blank time. In the active display time, the display apparatus performs normal data output and display by using a pixel drive circuit, and in the blank time, the display apparatus performs real time sensing and compensation (Real Time Sense) by using a sensing compensation circuit. In the embodiment of the present disclosure, the sensing compensation circuit can sense and compensate the electric characteristic of the element to be driven at a specified time (for example, during startup, shutdown, and other specified sensing times) in addition to real-time sensing and compensation of the electric characteristic of the element to be driven at a blank time.

In some exemplary embodiments, the scan signal driver may include multiple cascaded GOA (Gate On-Array) circuits.

In some exemplary embodiments, as shown in FIG. 6, the display panel further includes a memory, which is configured to store a sensing result of the sensing compensation circuit, and the memory may also include a lookup table for storing a correspondence between the sensing result and the compensation gain value.

Figure 7:
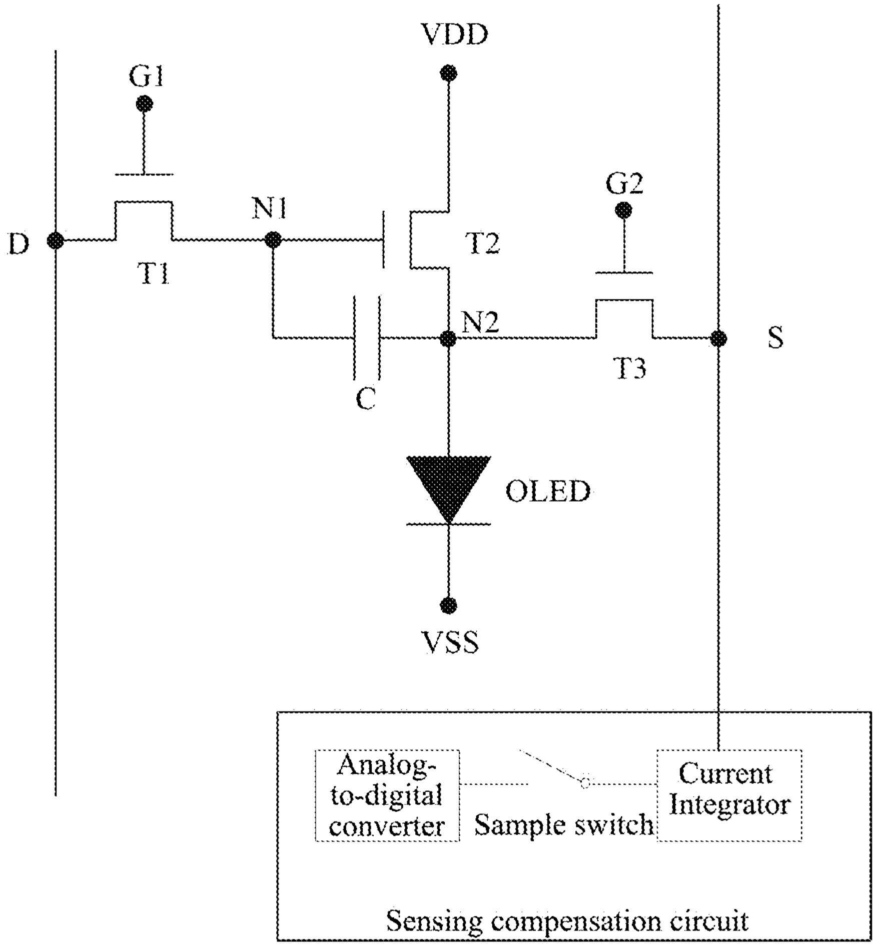
FIG. 7 is a schematic diagram of a connection relationship between a pixel drive circuit and a sensing compensation circuit according to an exemplary embodiment of the present disclosure.

FIG. 7 is a schematic diagram of a connection relationship between a pixel drive circuit and a sensing compensation circuit according to an exemplary embodiment of the present disclosure. The pixel drive circuit in FIG. 7 has a 3T1C structure and includes three transistors (first transistor T1, second transistor T2, and third transistor T3) and one storage capacitor C, however, the embodiments of the present disclosure are not limited thereto, and the pixel drive circuit may also include other numbers of transistors and storage capacitors. The pixel drive circuit is configured to receive the data voltage transmitted by the data signal line and output a corresponding current to the element to be driven under the control of the scan signal line.

In some exemplary embodiments, as shown in FIG. 7, a sensing compensation circuit is connected to a compensation signal line S for obtaining an amount of charges flowing through an element to be driven within a preset sensing time (i.e., a blank time), so that an external compensator calculates a compensation gain value of the element to be driven based on the obtained amount of charges.

In some exemplary embodiments, as shown in FIG. 7, the sensing compensation circuit includes a current integrator, a sampling switch, and an analog-to-digital converter connected in sequence.

One terminal of the current integrator is connected to the compensation signal line S, and the other terminal of the current integrator is connected to a first path terminal of the sampling switch.

A second path terminal of the sampling switch is connected to a first terminal of an analog-to-digital converter, and a control terminal of the sampling switch receives a sampling signal.

A second terminal of the analog-to-digital converter is connected with the timing controller.

In some exemplary embodiments, the first video signal may include a first synchronization signal and a first data signal DATA1, and the first synchronization signal may include a first frame synchronization signal VS1, a first row synchronization signal HS1, and a first data enabling signal DE1.

When a display interface transmits data, there is a certain positional relationship between active data and a starting signal (frame synchronization signal VS/row synchronization signal HS). This relationship is usually characterized by a set of Porch parameters. Exemplary, Porch parameters include number of horizontal total rows (HTotal), number of horizontal active rows (HActive), horizontal synchronization (HSYNC), horizontal back Porch (HBack Porch, HBP), horizontal front Porch (HFront Porch, HFP), horizontal blanking (HBlanking), end of active video (EAV), start of active video (SAV), number of vertical total rows (VTotal), number of vertical active rows (VActive), vertical front Porch (VFront Porch, VFP), vertical blanking interval (VBI), vertical back Porch (VBack Porch, VBP), vertical blanking (VBlanking), and so on. Wherein, VBP indicates the number of inactive rows after the frame synchronization signal at the beginning of a frame of picture, VFP indicates the number of inactive rows before the frame synchronization signal after the end of a frame of picture, HBP indicates the number of clock signals between the start of the row synchronization signal and the start of active data for one row, and HFP indicates the number of clock signals between the end of active data of one row and the start of the next row synchronization signal.

By adding the built-in picture generation module 502 in the timing controller in the embodiment of the present disclosure, the timing controller may generate a picture signal by itself, which includes a first frame synchronization signal VS1, a first row synchronization signal HS1, a first data enabling signal DE1 and a first data signal DATA1. Because the built-in picture generation module 502 uses the crystal oscillator on the TCON as the clock to generate the first video signal, the first video signal is very stable, and the width of the flag signal, the front shoulder value and the back shoulder value of the signal may be set according to the actual demand of sensing compensation.

In some exemplary embodiments, as shown in FIG. 5, the timing controller may also include a data decoding module 505.

The data decoding module 505 is configured to receive a second video signal externally input and decode the second video signal.

The multi-channel data selection module 503 is further configured to select the second video signal decoded by the data decoding module 505 as a video source in the display mode, and output the second video signal to the processing output module 504.

The processing output module 504 is further configured to process the second video signal and output the processed second video signal to a display panel to enable the display panel to display based on the second video signal.

In some exemplary embodiments, the second video signal externally input is a VBO (V-by-One) signal.

V-by-One is a digital interface standard specially developed for picture transmission. The input and output levels of the signal are low voltage differential signals (LVDS).

In some exemplary embodiments, the decoded second video signal includes a second synchronization signal including a second frame synchronization signal VS2, a second row synchronization signal HS2, and a second data enabling signal DE2, and a second data enabling signal DATA2.

In some exemplary embodiments, since the clock domains of the first video signal and the second video signal are different, in the multi-channel data selection module 503, corresponding caches may be provided for caching the first video signal or the second video signal.

Figure 8:
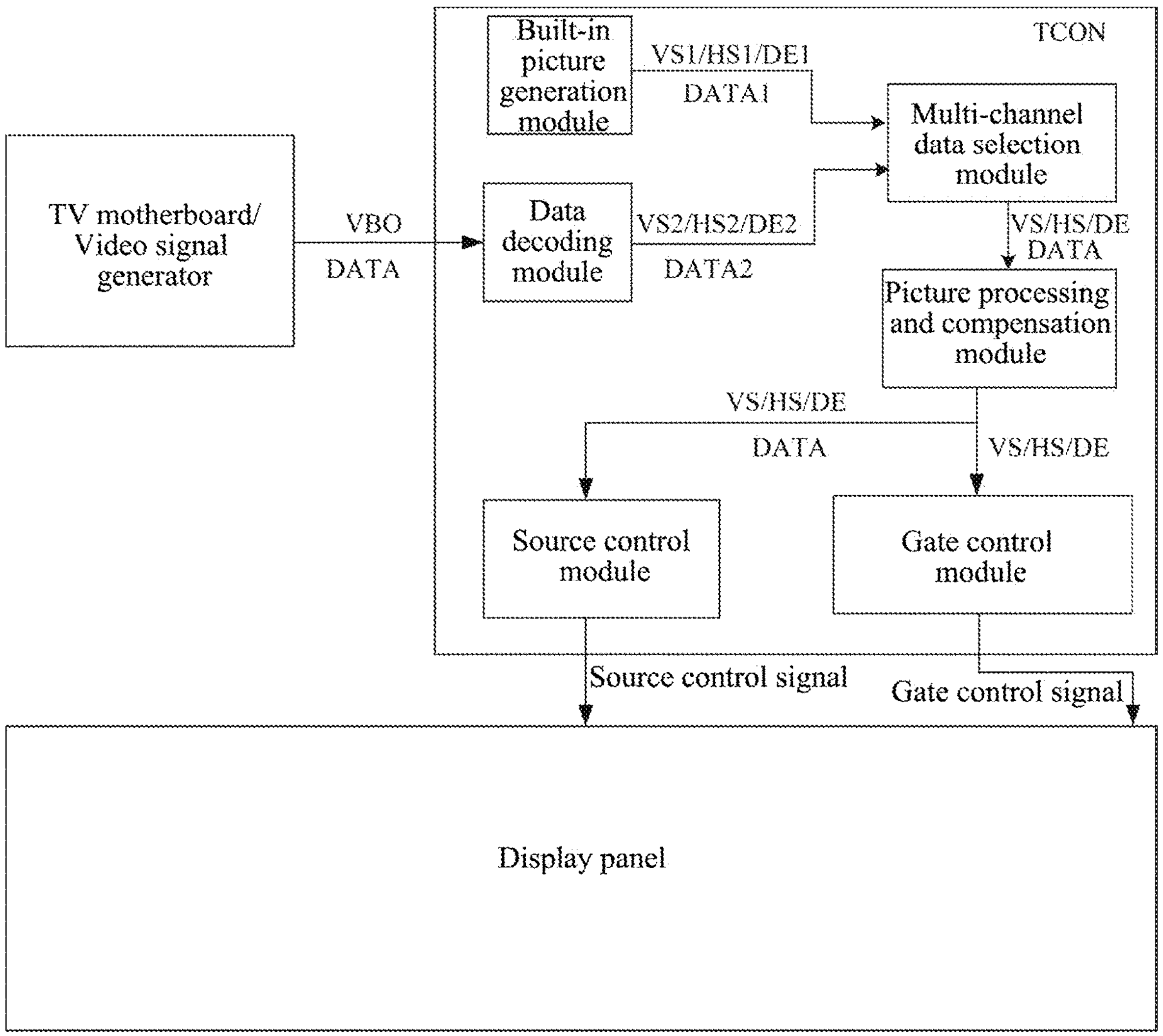
FIG. 8 is a schematic diagram of another structure of a display panel in an exemplary embodiment of the present disclosure.

As shown in FIG. 8, an embodiment of the present disclosure adds a built-in picture generation module 502 and a multi-channel data selection module 503 to the TCON, and both the built-in picture generation module 502 and the multi-channel data selection module 503 may be a hardware circuit module or software program module. When the display panel is lighted up normally, the data decoding module 505 is adopted to decode the signal transmitted by the TV motherboard (SOC board). After data calculation such as uniformity compensation and picture processing algorithm, the processed signal is transmitted to the gate control module and the source control module to generate a gate control signal and source control signal, which are respectively transmitted to the scan signal driver and the data signal driver of the display panel, and the display panel displays video pictures. When sensing compensation is performed, the display panel is driven to perform sensing compensation by controlling the multi-channel data selection module 503 and using the first video signal and the first synchronization signal generated by the built-in picture generation module 502 (i.e., the multi-channel data selection module 503 operates in the built-in picture mode). After the sensing compensation is completed, the signal sent by the SOC board is switched back (that is, the multi-channel data selection module 503 operates in the display mode), and the video picture is displayed normally.

In some exemplary embodiments, when the sensing compensation instruction is received, the sensing module 501 is further configured to notify the data decoding module 505.

The data decoding module 505 is further configured to receive a notification of the sensing module 501 and output black picture data with a first display duration.

Before switching from the display mode to the built-in picture mode, the multi-channel data selection module 503 is further configured to output the black picture data with the first display duration to the processing output module 504.

The processing output module 504 is further configured to process the black picture data with the first display duration, and output the processed black picture data to the display panel, to enable the display panel to display the black picture data with the first display duration before sensing compensation is performed based on the first video signal.

In other exemplary embodiments, the black picture data with the first display duration may also be provided by an external TV motherboard or video signal generator, which is not limited by the disclosed embodiments.

In some exemplary embodiments, the first display duration may be a two-frame display time or a one-frame display time. Exemplarily, the first display duration may be 35 ms.

Figure 9A:
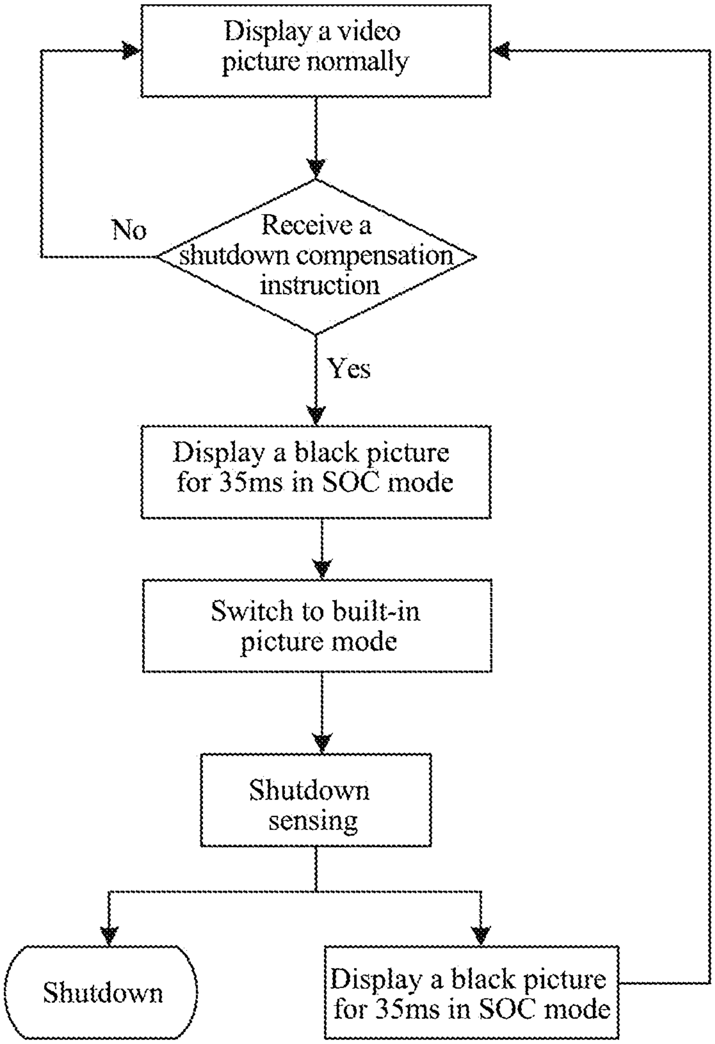
FIGS. 9A to 9C are sensing compensation flowcharts of three timing controllers according to exemplary embodiments of the present disclosure.

Exemplarily, as shown in FIG. 9A, during normal display, the timing controller senses whether a sensing compensation instruction is received while the timing controller operates in a display mode (SOC mode). When the sensing compensation instruction is received, a black picture is displayed in the display mode for 35 ms (more than time of two frames) to eliminate the residual charges on the screen. Then it is switched to the built-in picture mode, and then sensing compensation (sensing compensation under black picture) is performed. According to the design of TV system, after sensing and compensation is performed, it may be shut down or continue to display. If the system setting is direct shutdown, the shutdown operation is performed after compensation is completed. If the system setting is to continue to display, after the sensing compensation is completed, it is switched back to the SOC mode, a black picture is displayed for 35 ms, and then a normal video picture is displayed. The switching action has no visible features and will not be sensed by the user. The embodiment solves the problem of abnormal compensation caused by the instability of SOC signal in the sensing compensation process. Simultaneously In some exemplary embodiments, before generating the first video signal, the built-in picture generation module 502 is further configured to generate black picture data with a second display duration.

Before outputting the first video signal to the processing output module 504, the multi-channel data selection module 503 is further configured to output the black picture data with the second display duration to the processing output module 504.

The processing output module 504 is further configured to process the black picture data with the second display duration, and output the processed black picture data to the display panel, to enable the display panel to display the black picture data with the second display duration before sensing compensation is performed based on the first video signal.

In some exemplary embodiments, the second display duration may be a three-frame display time or a four-frame display time. Exemplarily, the second display duration may be 100 ms.

Figure 9B:
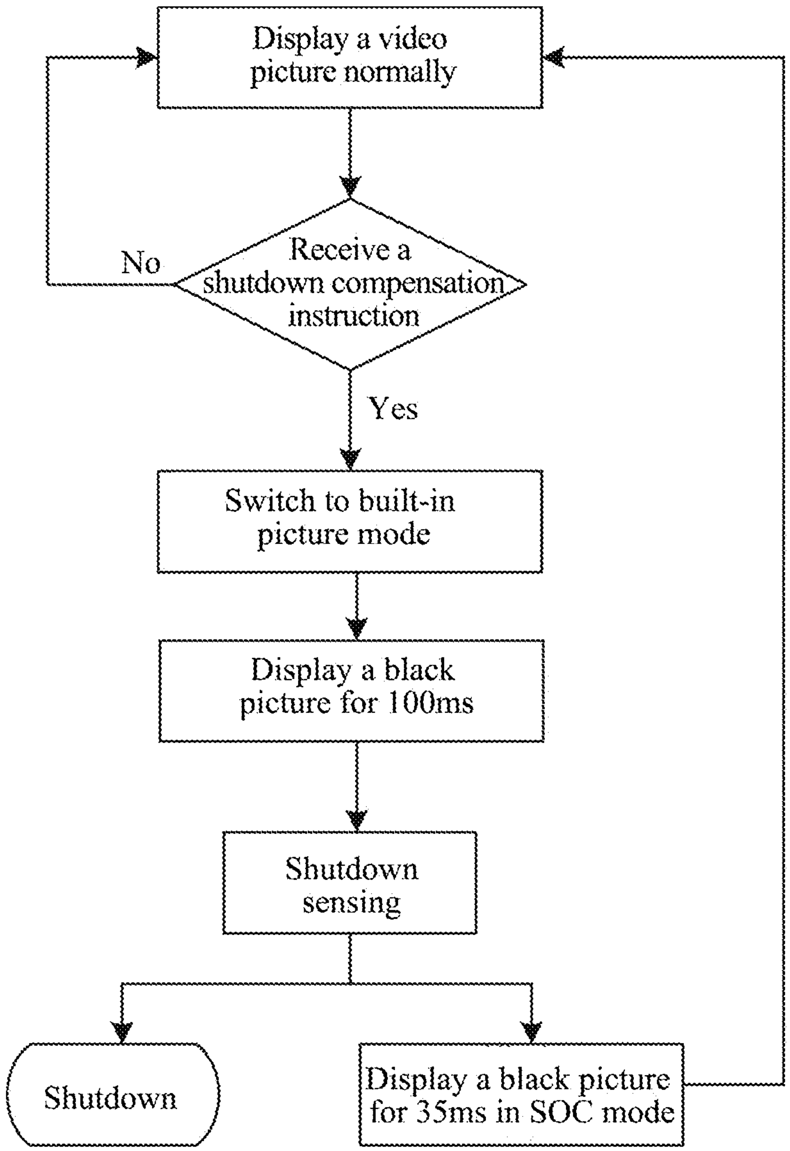

For example, as shown in FIG. 9B, after the sensing compensation instruction is received, the timing controller directly switches to the built-in picture mode, then displays a 100 ms black picture, and then performs sensing compensation, which not only solves the abnormal compensation problem caused by the unstable SOC signal during the sensing and compensation process, and but also avoid timing disorder for after the built-in picture mode is switched, the data signal driver is configured to receive 100 ms of normal display data first, and then perform sensing and compensation. Thereby, the occasional abnormal sensing problem caused for the data signal driver does not receive a normal driving signal when the shutdown sensing compensation is performed directly after the built-in picture mode is switched, can be avoided.

In some exemplary embodiments, the sensing module 501 is further configured to notify the data decoding module when receiving the sensing compensation instruction.

The data decoding module is further configured to receive a notification of the sensing module 501 and output black picture data with a first display duration.

Before generating the first video signal, the built-in picture generation module 502 is further configured to generate black picture data with a second display duration.

The multi-channel data selection module 503 is further configured to output the black picture data with the first display duration to the processing output module 504 before the display mode is switched to the built-in picture mode; and output the black picture data with the second display duration to the processing output module 504 before the first video signal is output to the processing output module 504.

The processing output module 504 is further configured to process the black picture data with the first display duration, and output the processed black picture data to the display panel, to enable the display panel to display the black picture data with the first display duration before sensing compensation is performed based on the first video signal; process the black picture data with the second display duration, and output the processed black picture data to the display panel, to enable the display panel to display the black picture data with the second display duration before sensing compensation is performed based on the first video signal.

In some exemplary embodiments, the first display duration may be a two-frame display time or a one-frame display time, and the second display duration may be a three-frame display time or a four-frame display time. Exemplarily, the first display duration may be 35 ms; and the second display duration may be 100 ms.

Figure 9C:
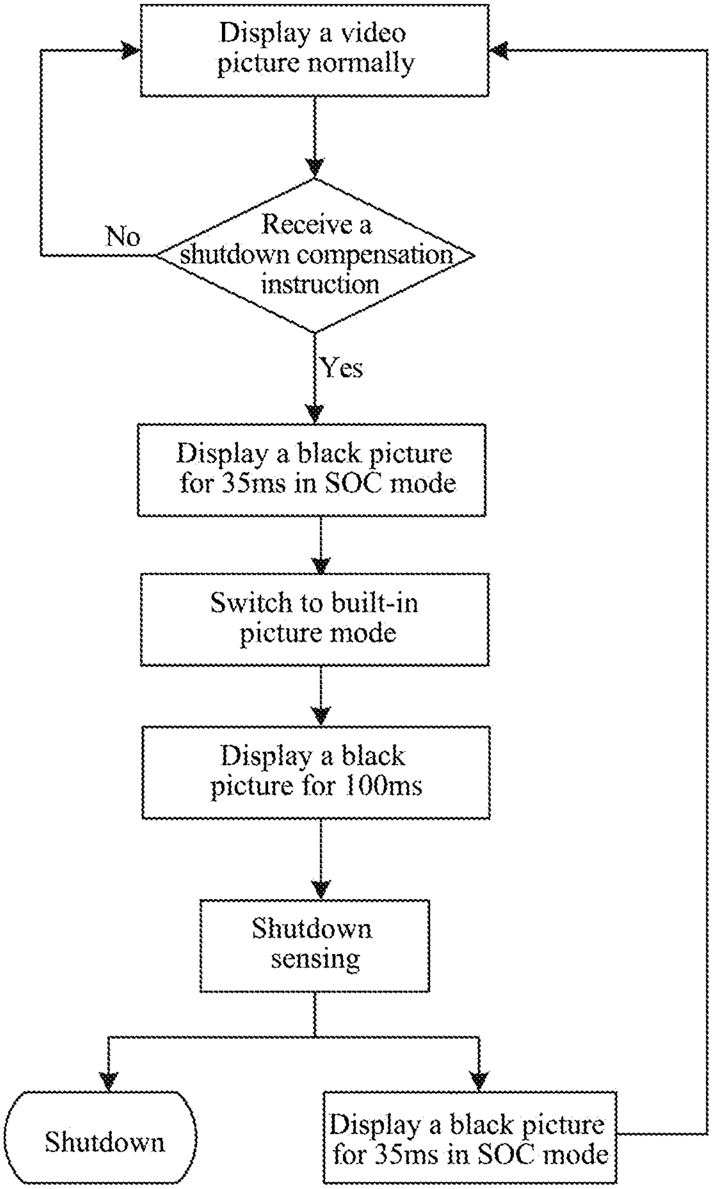

Exemplary, as shown in FIG. 9C, after the sensing compensation instruction is received, First, the black picture is displayed for 35 ms, and then it is switched to the built-in picture mode, then a black screen of 100 ms is displayed, and then a sensing compensation is carried out, which solves the abnormal compensation problem caused by the unstable SOC signal during the sensing and compensation process. In addition, it also avoids the occasional abnormal sensing problem caused for the data signal driver does not receive a normal driving signal when the shutdown sensing compensation is performed directly after the built-in picture mode is switched, and avoids the problem of slight flash screen which may occur in the process from displaying normal pictures in SOC mode to the black picture in the switched built-in picture mode.

Figure 10:
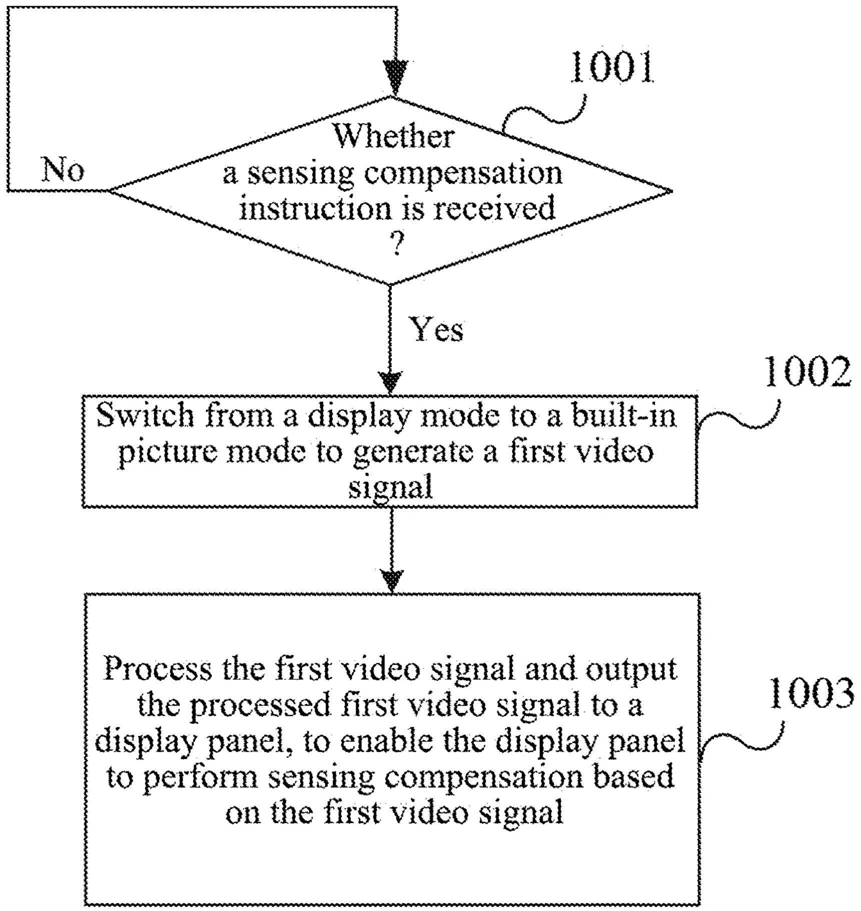
FIG. 10 is a schematic flowchart of a sensing compensation method according to an exemplary embodiment of the present disclosure.

As shown in FIG. 10, an embodiment of the present disclosure further provides a sensing compensation method, which is applied to a timing controller. The sensing compensation method includes the following acts 1001 to 1003.

In act 1001, in a display mode, the timing controller senses whether a sensing compensation instruction is received.

In act 1002, when the sensing compensation instruction is received, the timing controller switches from the display mode to a built-in picture mode to generate a first video signal.

In act 1003, the timing controller processes the first video signal, and output the processed first video signal to a display panel, to enable the display panel to perform sensing compensation based on the first video signal.

In some exemplary embodiments, in the act 1002, after receiving the sensing compensation instruction and before switching from the display mode to the built-in picture mode, the sensing compensation method further includes: in the display mode, generating, by the timing controller, black picture data with a first display duration, processing the black picture data with the first display duration, and outputting the processed black picture data to the display panel, to enable the display panel to display the black picture data with the first display duration before sensing compensation is performed based on the first video signal.

In some exemplary embodiments, in the act 1002, after switching from the display mode to the built-in picture mode and before generating the first video signal, the sensing compensation method further includes: in the built-in picture mode, generating, by the timing controller, black picture data with a second display duration, processing the black picture data with the second display duration, and outputting the processed black picture data to the display panel, to enable the display panel to display the black picture data with the second display duration before sensing compensation is performed based on the first video signal.

In some exemplary embodiments, in the act 1002, after receiving the sensing compensation instruction and before switching from the display mode to the built-in picture mode, the sensing compensation method further includes: in the display mode, generating, by the timing controller, black picture data with a first display duration, processing the black picture data with the first display duration, and outputting the processed black picture data to the display panel, to enable the display panel to display the black picture data with the first display duration before sensing compensation is performed based on the first video signal; after switching from the display mode to the built-in picture mode and before generating the first video signal, the sensing compensation method further includes: in the built-in picture mode, generating, by the timing controller, black picture data with a second display duration, processing the black picture data with the second display duration, and outputting the processed black picture data to the display panel, to enable the display panel to display the black picture data with the second display duration before sensing compensation is performed based on the first video signal.

In some exemplary embodiments, the first display duration may be a two-frame display time or a one-frame display time. Exemplarily, the first display duration may be 35 ms.

In some exemplary embodiments, the second display duration may be a three-frame display time or a four-frame display time. Exemplarily, the second display duration may be 100 ms.

An embodiment of the present disclosure further provide a timing controller, including a memory, and a processor connected to the memory for storing instructions, the processor is configured to perform the acts of the sensing compensation method described in any embodiment of the present disclosure based on the instructions stored in the memory.

Figure 11:
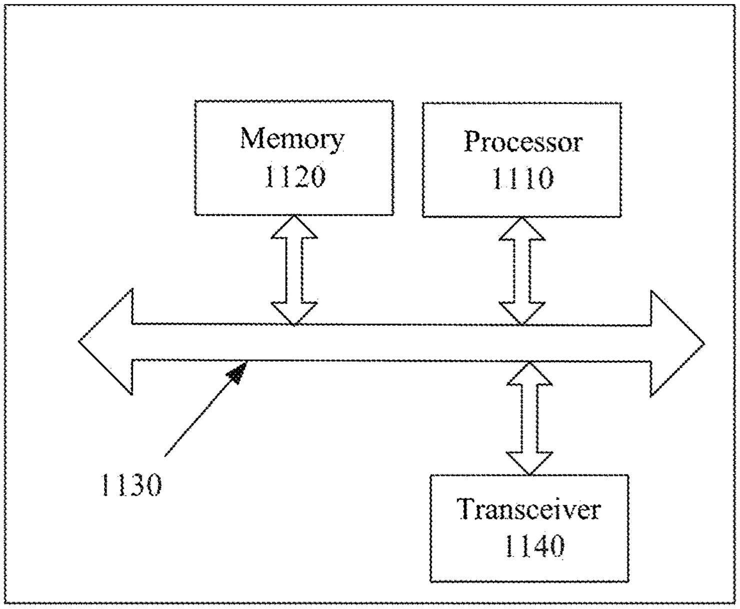
FIG. 11 is a schematic diagram of another structure of a timing controller according to an exemplary embodiment of the present disclosure.

In an example, as shown in FIG. 11, the timing controller may include: a processor 1110, a memory 1120, a bus system 1130 and a transceiver 1140. The processor 1110, the memory 1120 and the transceiver 1140 are connected through the bus system 1130, the memory 1120 is used to store instructions, and the processor 1110 is used to execute the instructions stored in the memory 1120 to control the transceiver 1140 to send and receive signals. Specifically, the transceiver 1140 may receive a sensing compensation instruction under control of the processor 1110; the processor 1110 senses whether the sensing compensation instruction is received in a display mode; when the sensing compensation instruction is received, switch the display mode to the built-in picture mode to generate a first video signal; process the first video signal and output the processed first video signal to the display panel, so that the display panel performs sensing compensation based on the first video signal.

It should be understood that the processor 1110 may be a Central Processing Unit (CPU), or the processor 1110 may be another general-purpose processor, a digital signal processor (DSP), an application specific integrated circuit (ASIC), a field programmable gate array (FPGA), or another programmable logic device, a discrete gate or a transistor logic device, a discrete hardware component, etc. The general-purpose processor may be a microprocessor, or the processor may be any conventional processor, etc.

The memory 1120 may include a read-only memory and a random access memory, and provides instructions and data to the processor 1110. A portion of the memory 1120 may also include a non-volatile random access memory. For example, the memory 1120 may also store information of a device type.

The bus system 1130 may include a power bus, a control bus, a status signal bus, or the like in addition to a data bus. However, for clarity of illustration, various buses are all denoted as the bus system 1130 in FIG. 11.

In an implementation process, processing performed by the processing device may be completed by an integrated logic circuit of hardware in the processor 1110 or instructions in a form of software. That is, the acts of the method in the embodiments of the present disclosure may be embodied as executed and completed by a hardware processor, or executed and completed by a combination of hardware in the processor and a software module. The software module may be located in a storage medium such as a random access memory, a flash memory, a read only memory, a programmable read-only memory, or an electrically erasable programmable memory, or a register, etc. The storage medium is located in the memory 1120. The processor 1110 reads information in the memory 1120, and completes the acts of the above method in combination with its hardware. In order to avoid repetition, detailed description is not provided herein.

An embodiment of the present disclosure further provides a computer-readable storage medium, on which a computer program is stored, and when the program is executed by a processor, the sensing compensation method described in any embodiment of the present disclosure is implemented.

In some possible embodiments, the various aspects of the sensing compensation method provided herein may also be implemented in the form of a program product, which includes a program code. When the program product is run on a computer device, the program code is used to enable the computer device to perform the acts in the sensing compensation method described above in this specification according to various exemplary embodiments of the present application, for example, the computer device may perform the sensing compensation method described in embodiments of the present application.

The program product may employ any combination of one or more readable media. The readable medium may be a readable signal medium or a readable storage medium. The readable storage medium may be, for example, but not limited to, an electrical, magnetic, optical, electromagnetic, infrared, or semiconductor system, apparatus or device, or a combination of any of the above. More specific examples (non-exhaustive list) of readable storage media include: electrical connection with one or more wires, portable disk, hard disk, random access memory (RAM), read only memory (ROM), erasable programmable read only memory (EPROM or flash memory), optical fiber, portable compact disc read only memory (CD-ROM), optical storage device, magnetic storage device, or any suitable combination of the above.

It may be understood by those of ordinary skill in the art that all or some acts in a method and function modules/units in a system and an apparatus disclosed above may be implemented as software, firmware, hardware, and appropriate combinations thereof. In a hardware implementation, division of the function modules/units mentioned in the above description is not always corresponding to division of physical components. For example, a physical component may have multiple functions, or a function or an act may be executed by several physical components in cooperation. Some components or all components may be implemented as software executed by a processor such as a digital signal processor or a microprocessor, or implemented as hardware, or implemented as an integrated circuit such as an application specific integrated circuit. Such software may be distributed in a computer-readable medium, and the computer-readable medium may include a computer storage medium (or a non-transitory medium) and a communication medium (or a transitory medium). As known to those of ordinary skill in the art, the term computer storage medium includes volatile and nonvolatile, and removable and irremovable media implemented in any method or technology for storing information (for example, a computer-readable instruction, a data structure, a program module, or other data). The computer storage medium includes, but is not limited to, RAM, ROM, EEPROM, a flash memory or another memory technology, CD-ROM, a digital versatile disk (DVD) or another optical disk storage, a magnetic cassette, a magnetic tape, a magnetic disk storage, or another magnetic storage apparatus, or any other medium that may be configured to store desired information and may be accessed by a computer. In addition, it is known to those of ordinary skill in the art that the communication medium usually includes a computer-readable instruction, a data structure, a program module, or other data in a modulated data signal of, such as, a carrier or another transmission mechanism, and may include any information delivery medium.

An embodiment of the present disclosure further provides a timing controller including a sensing circuit, a built-in picture generation circuit, a multi-channel data selection circuit, and a processing output circuit.

The sensing circuit is configured to sense whether a sensing compensation instruction is received; and when the sensing compensation instruction is received, notify the built-in picture generation circuit and the multi-channel data selection circuit.

The built-in picture generation circuit is configured to receive a notification from the sensing circuit and generate a first video signal.

The multi-channel data selection circuit is configured to receive a notification from the sensing circuit, switch from a display mode to a built-in picture mode, select the first video signal generated by the built-in picture generation circuit as a video source, and output the first video signal to the processing output circuit.

The processing output circuit is configured to process the first video signal and output the processed first video signal to the display panel, to enable the display panel to perform sensing compensation based on the first video signal.

The timing controller of the embodiment of the present disclosure may be realized by a Field Programmable Gate Array (FPGA) or an Application Specific Integrated Circuit (ASIC), and may also be realized by other programmable devices, which is not limited by the present disclosure.

In some exemplary embodiments, the timing controller may further include a data decoding circuit.

The data decoding circuit is configured to receive an externally input second video signal and decode the second video signal.

The multi-channel data selection circuit is further configured to select the second video signal decoded by the data decoding circuit as a video source in the display mode, and output the second video signal to the processing output circuit.

The processing output circuit is further configured to process the second video signal and output the processed second video signal to the display panel, to enable the display panel to display based on the second video signal.

In some exemplary embodiments, the processing output circuit may include a picture processing and compensation circuit, a source drive control circuit, and a gate drive control circuit, and the display panel includes a data signal driver and a scan signal driver.

The picture processing and compensation circuit is configured to perform picture processing and uniformity compensation on the first video signal or the second video signal, and output the first video signal or the second video signal after the picture processing and uniformity compensation is performed to the source drive control circuit and the gate drive control circuit.

The source drive control circuit is configured to generate a source control signal and a data signal according to the first video signal or the second video signal and output to the data signal driver.

The gate drive control circuit is configured to generate a gate control signal according to the first video signal or the second video signal and output to the scan signal driver.

In some exemplary embodiments, the sensing circuit is further configured to notify the data decoding circuit when receiving the sensing compensation instruction;

The data decoding circuit is further configured to receive a notification of the sensing circuit and output black picture data with a first display duration.

Before switching from the display mode to the built-in picture mode, the multi-channel data selection circuit is further configured to output the black picture data with the first display duration to the processing output circuit; and The processing output circuit is further configured to process the black picture data with the first display duration, and output the processed black picture data to the display panel, to enable the display panel to display the black picture data with the first display duration before sensing compensation is performed based on the first video signal.

In some exemplary embodiments, before generating the first video signal, the built-in picture generation circuit is further configured to generate black picture data with a second display duration.

Before outputting the first video signal to the processing output circuit, the multi-channel data selection circuit is further configured to output the black picture data with the second display duration to the processing output circuit.

The processing output circuit is further configured to process the black picture data with the second display duration, and output the processed black picture data to the display panel, to enable the display panel to display the black picture data with the second display duration before sensing compensation is performed based on the first video signal.

In some exemplary embodiments, the sensing circuit is further configured to notify the data decoding circuit when the sensing compensation instruction is received.

The data decoding circuit is further configured to receive a notification of the sensing circuit and output the black picture data with the first display duration.

Before generating the first video signal, the built-in picture generation circuit is further configured to generate black picture data with a second display duration.

The multi-channel data selection circuit is further configured to output the black picture data with the first display duration to the processing output circuit before switching from the display mode to the built-in picture mode; and output the black picture data with the second display duration to the processing output circuit before outputting the first video signal to the processing output circuit.

The processing output circuit is further configured to process the black picture data with the first display duration, and output the processed black picture data to the display panel, to enable the display panel to display the black picture data with the first display duration before sensing compensation is performed based on the first video signal; process the black picture data with the second display duration, and output the processed black picture data to the display panel, to enable the display panel to display the black picture data with the second display duration before sensing compensation is performed based on the first video signal.

In some exemplary embodiments, the first display duration may be a two-frame display time or a one-frame display time. Exemplarily, the first display duration may be 35 ms.

In some exemplary embodiments, the second display duration may be a three-frame display time or a four-frame display time. Exemplarily, the second display duration may be 100 ms.

Although the implementations disclosed in the present disclosure are described as above, the described contents are only implementations which are used for facilitating the understanding of the present disclosure, but are not intended to limit the present invention. Any skilled person in the art to which the present disclosure pertains may make any modifications and variations in forms and details of implementation without departing from the spirit and scope of the present disclosure. However, the patent protection scope of the present invention should be subject to the scope defined by the appended claims.

The invention claimed is:

1. A timing controller, comprising a sensing circuit, a built-in picture generation circuit, a multi-channel data selection circuit and a processing output circuit, wherein:

the sensing circuit is configured to sense whether a sensing compensation instruction is received, and when the sensing compensation instruction is received, notify the built-in picture generation circuit and the multi-channel data selection circuit;

the built-in picture generation circuit is configured to receive a notification from the sensing circuit and generate a first video signal;

the multi-channel data selection circuit is configured to receive a notification from the sensing circuit, switch from a display mode to a built-in picture mode, select the first video signal generated by the built-in picture generation circuit as a video source, and output the first video signal to the processing output circuit; and the processing output circuit is configured to process the first video signal and output the processed first video signal to a display panel to enable the display panel to perform sensing compensation based on the processed first video signal;

wherein the timing controller further comprises a data decoding circuit;

when the sensing compensation instruction is received, the sensing circuit is further configured to notify the data decoding circuit;

the data decoding circuit is configured to receive a notification from the sensing circuit and output black picture data with a first display duration;

before switching from the display mode to the built-in picture mode, the multi-channel data selection circuit is further configured to output the black picture data with the first display duration to the processing output circuit; and the processing output circuit is further configured to process the black picture data with the first display duration, and output the processed black picture data to the display panel, to enable the display panel to display the black picture data with the first display duration before the sensing compensation is performed based on the processed first video signal;

wherein the first display duration is a two-frame display time or a one-frame display time; and the first video signal comprises a first synchronization signal and a first data signal, the first synchronization signal comprises a first frame synchronization signal, a first row synchronization signal and a first data enabling signal.

2. The timing controller according to claim 1, wherein, the data decoding circuit is further configured to receive a second video signal externally input and decode the second video signal;

the multi-channel data selection circuit is further configured to select the second video signal decoded by the data decoding circuit as a video source in the display mode, and output the second video signal to the processing output circuit; and the processing output circuit is further configured to process the second video signal and output the processed second video signal to the display panel to enable the display panel to display based on the processed second video signal.

3. The timing controller according to claim 2, wherein before generating the first video signal, the built-in picture generation circuit is further configured to generate black picture data with a second display duration;

before outputting the first video signal to the processing output circuit, the multi-channel data selection circuit is further configured to output the black picture data with the second display duration to the processing output circuit; and the processing output circuit is further configured to process the black picture data with the second display duration, and output the processed black picture data to the display panel, to enable the display panel to display the black picture data with the second display duration before the sensing compensation is performed based on the processed first video signal.

4. The timing controller according to claim 3, wherein the second display duration is a three-frame display time or a four-frame display time.

5. The timing controller according to claim 2, wherein the second video signal externally input is a V-by-One (VBO) signal, the decoded second video signal comprises a second synchronization signal and a second data signal, and the second synchronization signal comprises a second frame synchronization signal, a second row synchronization signal and a second data enabling signal.

6. The timing controller according to claim 2, wherein the processing output circuit comprises a picture processing and compensation circuit, a source drive control circuit and a gate drive control circuit, and the display panel comprises a data signal driver and a scan signal driver;

the picture processing and compensation circuit is configured to perform picture processing and uniformity compensation on the first video signal or the second video signal, and output the first video signal or the second video signal on which the picture processing and uniformity compensation is performed to the source drive control circuit and the gate drive control circuit;

the source drive control circuit is configured to generate a source control signal and a data signal according to the first video signal or the second video signal and output to the data signal driver; and the gate drive control circuit is configured to generate a gate control signal according to the first video signal or the second video signal and output to the scan signal driver.

7. The timing controller according to claim 1, wherein before generating the first video signal, the built-in picture generation circuit is further configured to generate black picture data with a second display duration;

the multi-channel data selection circuit is further configured to output the black picture data with the second display duration to the processing output circuit before outputting the first video signal to the processing output circuit;

the processing output circuit is further configured to process the black picture data with the second display duration, and output the processed black picture data to the display panel, to enable the display panel to display the black picture data with the second display duration before the sensing compensation is performed based on the processed first video signal.

8. The timing controller according to claim 7, wherein the first display duration is a two-frame display time or a one-frame display time, and the second display duration is a three-frame display time or a four-frame display time.

9. The timing controller according to claim 1, wherein the sensing compensation instruction is sent over an inter-integrated circuit (IIC) bus.

10. A display panel, comprising: the timing controller according to claim 1.

11. The timing controller according to claim 1, wherein the sensing compensation instruction is a sensing compensation instruction during startup, a sensing compensation instruction during shutdown, or a sensing compensation instruction to be executed at user-specified time.

12. A sensing compensation method, comprising:

sensing, by a timing controller, whether a sensing compensation instruction is received in a display mode;

when the sensing compensation instruction is received, switching, by the timing controller, from the display mode to a built-in picture mode and generate a first video signal;

processing, by the timing controller, the first video signal, and outputting the processed first video signal to a display panel to enable the display panel to perform sensing compensation based on the first processed video signal;

wherein, after receiving the sensing compensation instruction and before switching from the display mode to the built-in picture mode, the method further comprises:

in the display mode, generating, by the timing controller, black picture data with a first display duration, processing the black picture data with the first display duration, and outputting the processed black picture data to the display panel, to enable the display panel to display the black picture data with the first display duration before the sensing compensation is performed based on the processed first video signal; wherein the first display duration is a two-frame display time or a one-frame display time; and the first video signal comprises a first synchronization signal and a first data signal, the first synchronization signal comprises a first frame synchronization signal, a first row synchronization signal and a first data enabling signal.

13. The sensing compensation method according to claim 12, wherein, after switching from the display mode to the built-in picture mode and before generating the first video signal, the method further comprises:

in the built-in picture mode, generating, by the timing controller, black picture data with a second display duration, processing the black picture data with the second display duration, and outputting the processed black picture data to the display panel, to enable the display panel to display the black picture data with the second display duration before the sensing compensation is performed based on the processed first video signal.

14. The sensing compensation method according to claim 13, wherein, the second display duration is a three-frame display time or a four-frame display time.

15. A timing controller comprising a memory and a processor connected to the memory, wherein the memory is used for storing instructions, the processor is configured to perform the acts of the sensing compensation method according to claim 12 based on the instructions stored in the memory.

16. A computer-readable non-volatile storage medium, on which a computer program is stored, and when the program is executed by a processor, the sensing compensation method according to claim 12 is implemented.

* * * * *